(12) United States Patent
Bon

(10) Patent No.: US 6,191,840 B1
(45) Date of Patent: Feb. 20, 2001

(54) MANUFACTURING METHOD FOR ELECTRO-OPTICAL CELLS OR ELECTROCHEMICAL PHOTOVOLTAIC CELLS OBTAINED FROM THIS METHOD

(75) Inventor: Patrick Bon, Hauterive (CH)

(73) Assignee: EM Microelectronic-Marin SA, Marin (CH)

(*) Notice: Under 35 U.S.C. 154(b), the term of this patent shall be extended for 0 days.

(21) Appl. No.: 09/271,317

(22) Filed: Mar. 18, 1999

(30) Foreign Application Priority Data

Mar. 30, 1998 (CH) .................................. 10-0759

(51) Int. Cl.[7] .................................................. G02F 1/13
(52) U.S. Cl. ............................................ 349/187; 349/158
(58) Field of Search .................................. 349/187, 158, 349/149

(56) References Cited

U.S. PATENT DOCUMENTS 5,492,582   2/1996   Ide et al. .

6,066,018 * 5/2000 Grupp et al. ...................... 445/25

FOREIGN PATENT DOCUMENTS 860732    2/1997   (EP) .
95/19587  7/1995   (WO) .

* cited by examiner

*Primary Examiner*—James A. Dudek
(74) *Attorney, Agent, or Firm*—Sughrue, Mion, Zinn, Macpeak & Seas, PLLC

(57) ABSTRACT

The invention concerns a manufacturing method for electro-optical or electrochemical photovoltaic cells (10), each cell (10) including front (1) and back (2) substrates bonded to each other by a sealing frame in which an active medium is confined, each frame (12) having, for this purpose, a filling aperture (14), the cell (10) further including contact pads (8) for establishing the electric connection between the electrodes (4, 6) of said cell (10) and an electric supply or control circuit, a method wherein the cells (10) are separated individually by means of a water jet and the rectilinear edges (24) scribed on one of the substrates (1, 2) in order to allow the contact pads (8) of the cells (10) to appear are situated in a location not opposite the filling aperture (14) thereof.

2 Claims, 3 Drawing Sheets

MANUFACTURING METHOD FOR ELECTRO-OPTICAL CELLS OR ELECTROCHEMICAL PHOTOVOLTAIC CELLS OBTAINED FROM THIS METHOD

BACKGROUND OF THE INVENTION

The present invention concerns a manufacturing method for electro-optical cells, in particular liquid crystal cells, or electrochemical photovoltaic cells, each cell including a transparent front substrate and a back substrate which may or may not be transparent onto which is formed a pattern of conductive elements forming electrodes and conductive paths connecting these electrodes to contact pads, the two substrates being bonded together by a sealing frame defining a sealed volume in which an active medium is confined. The present invention also concerns a cell obtained from this method.

"Electro-optical cell" is used to mean a display cell wherein the electro-optical features of the liquid crystals confined between the two substrates of said cell can be modified by electric control signals applied across the electrodes. Moreover, the electrochemical photovoltaic cells are cells capable of converting visible light into electricity by exploiting the photoelectric effect which appears in a semiconductor substrate sensitised by a dye.

A batch manufacturing method for liquid crystal display cells of the type described hereinbefore will be examined with reference to FIGS. 1 to 3 annexed to the present Application, FIG. 1 being a partial schematic plane view of a batch of liquid crystal display cells during manufacturing, and FIGS. 2 and 3 being respectively a plane view and a cross-section along the line III—III of FIG. 2 of an individual display cell.

The above method consists in forming, conventionally by photolithography, on two large front and back substrates respectively 1 and 2 which are made of glass or a synthetic material and at least one of which is transparent, a pattern of conductive elements which are also transparent. These conductive elements form control electrodes 4 and 6. These electrodes 4 and 6 are situated at the location of pictures to be displayed and conductive paths connect them to contact pads 8 situated at the periphery of each cell 10. A network of material forming sealing frames 12 is then deposited on one of substrates 1, 2, said sealing frames each forming a sealed volume in which the liquid crystal will subsequently be confined. For this purpose, a filling aperture 14 is arranged in sealing frames 12 for each cell 10, then substrates 1, 2 are bonded to each other to form an assembly including several rows of open cells 10. This assembly is then divided into rectilinear strips 16 by glass scribing and breaking techniques, or by sawing along dividing lines 18 which form the longitudinal edges 20 of strips 16. These dividing lines 18 are rectilinear and parallel and are shown in dot and dash lines in FIG. 1. As filling apertures 14 are all situated along the same longitudinal edge 20 of strip 16, it is easy to fill cells 10 then to hermetically seal the filling apertures 14 thereof. Strips 16 are finally divided into individual rectangular cells 10 along straight lines perpendicular to the preceding lines. At this stage, if the contour of cells 10 has to have portions different from the rectangular shape, such portions are shaped by grinding. Any outer layers such as, for example, a polariser film 22, are applied subsequently, since otherwise there is a risk of the deterioration thereof by the cutting and grinding operations. These manufacturing steps which have to be effected individually on each cell 10 make manufacturing more complex and expensive than if they could be performed on a complete batch of cells 10.

Further, as shown in FIGS. 2 and 3, each cell 10 has a rectilinear edge 24 where back substrate 2 projects with respect to front substrate 1, in order to allow contact pads 8 to appear and thus to create a connection zone 26 which can be accessed to establish the electric connection between electrodes 4, 6 of cell 10 and an electric control circuit (not shown) capable of modifying the electro-optical features of the liquid crystal. As is clear from FIG. 1, connection zones 26 of cells 10 are all aligned along one of longitudinal edges 20 of strips 16 and are opposite to filling apertures 14 of cells 10.

Rectilinear edge 24 of cells 10 is conventionally marked by scribing by means of a diamond tool, so that lines of least mechanical resistance 28, which are rectilinear and parallel to dividing lines 18, are generated at the surface of front substrate 1. After cutting out a strip 16, the glass can be broken manually along line 28, by slight bending transversely to said line 16, thus allowing connection pads 8 of cells 10 to appear.

The above glass scribing and breaking operation is relatively simple to implement. Cells 10 thereby obtained have, however, the significant drawback of having only one connection zone 26, which limits the number of available connection pads 8, and thus the number of pictures which it is possible to display by means of such a cell 10. In order to overcome this difficulty, a known solution consists in multiplexing electrodes 4, 6 of cells 10, which means that a same electrode can control the display of at least two different pictures. It has however been observed that the nigher the multiplexing rate of electrodes 4, 6, the less satisfactory the resulting optical display quality.

There therefore existed a need in the state of the art for display cells having two connection zones 26 instead of a single such zone. One possible solution to this problem would have been to envisage arranged connection zones 26 not opposite filling apertures 14, i.e. longitudinally to strips 16, but transversely to said strips 16. A major prejudice has however always opposed the implementation of this solution.

It is known that glass scribing by means of a diamond tool generates at the surface of the glass a network of superficial mechanical stress which contribute to breakage of the glass at the place where it was scribed. It was nonetheless commonly admitted to date that the glass had to be broken shortly after being scribed. It was thought that if this was not the case, the network of stress generated by scribing the glass would tend to relax so that the glass would break less cleanly and would have irregularities which are unacceptable within the field of display cell manufacture. It is for this reason that connection zones 26 of cells 10 have until now always been aligned along one of longitudinal edges 20 of strips 16, so that the glass of front substrate 1 could be broken shortly after having been scribed, i.e. immediately after cutting a strip 16. However, in the hypothesis in which connection zones 26 are arranged transversely to strip 16, the bending of said strip 16 would not allow the glass between two adjacent cells 10 to be broken. This operation would thus have to be performed after application of polariser films 22, a long and difficult step, and dividing cells 10 individually. It was thus thought that the period of time between the moment when the glass is scribed and the moment when the latter is broken was too long and make this operation impossible because of the phenomenon of stress relaxation described hereinbefore. This is why those skilled in the art has always rejected this solution to date.

SUMMARY OF THE INVENTION

An object of the present invention is to overcome the above problems and drawbacks by providing a batch manufacturing method for electro-optical cells or electrochemical photovoltaic cells allowing the connection pads of the cell electrodes to appear at any location on the perimeter of said cells.

The present invention thus concerns a manufacturing method for a plurality of electro-optical cells, in particular liquid crystal cells, or electrochemical photovoltaic cells, including the steps of:

forming on two substrates made of glass or a synthetic material at least one of which is transparent, a pattern of conductive elements, these conductive elements forming electrodes situated at the location of pictures to be displayed and conductive paths connecting these electrodes to contact pads situated at the periphery of said cells;

depositing on one of the substrates a network of material forming sealing frames which define for each cell a sealed volume in which an active medium is confined, each sealing frame including a filling aperture for this purpose;

bending the substrates to each other to form a batch including several rows of cells;

scribing rectilinear edges on one of the substrates in order to allow the contact pads to appear at the periphery of each cell; and dividing the batch of cells into rectilinear strips each including a row of cells;

this method being characterised in that each strip of cells is divided into individual cells by means of a water jet with, as necessary, shaping of the contour of the cells, and in that the rectilinear edges marked by scribing on one of the substrates in order to allow the contact pads of the cells to appear are situated in a location which is not opposite the filling apertures thereof.

As a result of these features, the method according to the invention allows the cells to be practically finished while they are still in strips. As the water jet is very fine, it does not alter the neighbouring parts of the cutting line, so that all the outer layers such as a polariser film can be applied onto the cell batches. Further, cutting out does not need to be performed in straight lines, but can directly follow the final contour of each cell, thus avoiding any subsequent shaping thereof such as grinding. Moreover, the invention has overcome the widespread prejudice according to which the glass had to be broken shortly after having been scribed, at the risk of seeing the network of stress generated by scribing relaxing and the glass breaking less cleanly. Surprisingly, it has been observed that the action of the water jet used for the division of a strip of cells into individual cells is sufficient to cause the glass to break along a perfectly rectilinear edge even when such edge has been marked by scribing a long time ago. In particular, it is possible to apply all the outer layers such as, for example, the polariser film, prior to separating the individual cells. It is known that the operation of bonding polariser films is long and difficult, consequently introducing a significant delay between the moment when the glass is scribed and the moment when it is broken. However, despite this delay, it has been observed that the action of the water jet at the moment when the cells are finally cut out is sufficient to break the glass without difficulty.

The cell according to the invention can thus have several connection zones instead of just one, which allows the number of contact pads for the cell to be substantially increased, and thus the number of pictures which it is possible to display, and/or to reduce the multiplexing rate of the electrodes, which improves the optical qualities of the display.

BRIEF DESCRIPTION OF THE DRAWING

Other features and advantages of the present invention will appear more clearly upon reading the following detailed description of an implementation example of the method according to the invention, this example being given purely by way of illustrative and non limiting example, in conjunction with the annexed drawings, in which.

DETAILED DESCRIPTION OF THE INVENTION

In the following description, the elements which are identical to those previously described will be designated by the same numerical references.

It will be noted first of all that, although the present invention is described with reference to an electro-optical display cell, it applies in a similar manner to electrochemical photovoltaic cells of the type described hereinbefore.

Figure 1:
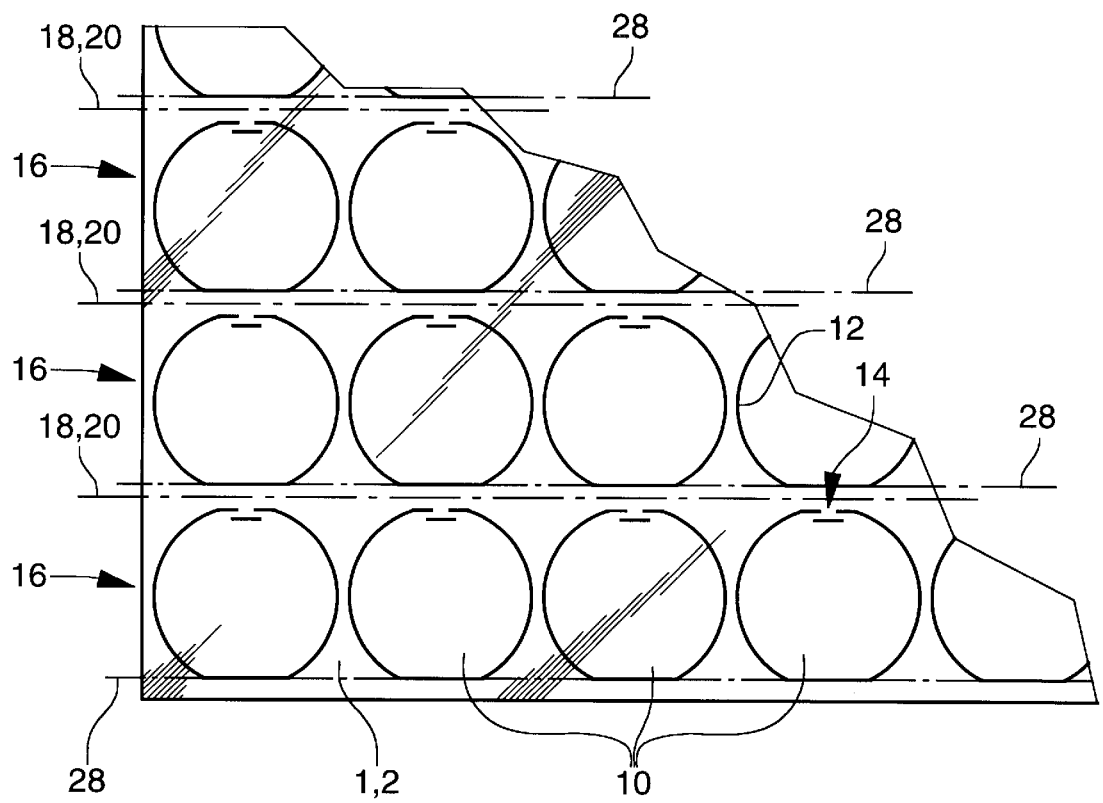
FIG. 1, which has already been cited, is a partial schematic plane view of a batch of liquid crystal display cells during manufacture in accordance with a method of the prior art.
Figure 2:
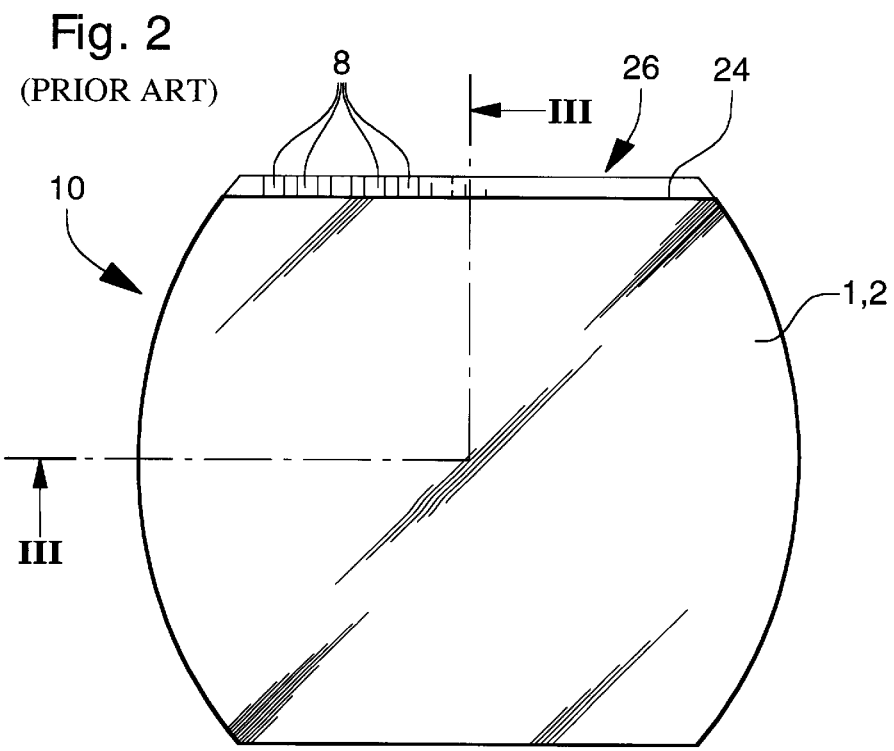
FIG. 2, which has already been cited, is a plane view of an individual display cell according to the prior art.
Figure 3:
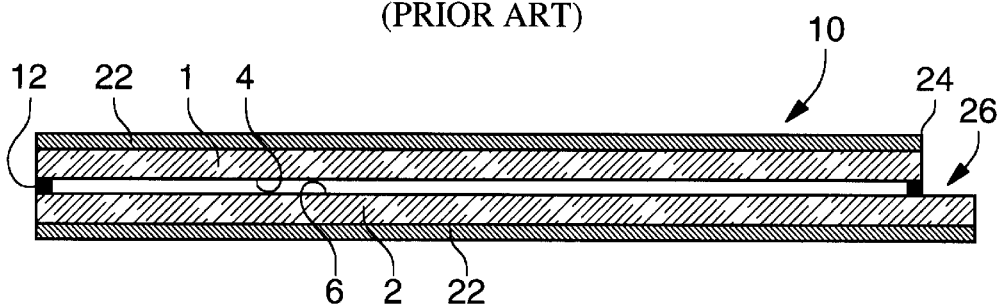
FIG. 3, which has already been cited, is a cross-section along the line III—III of FIG. 2.
Figure 4:
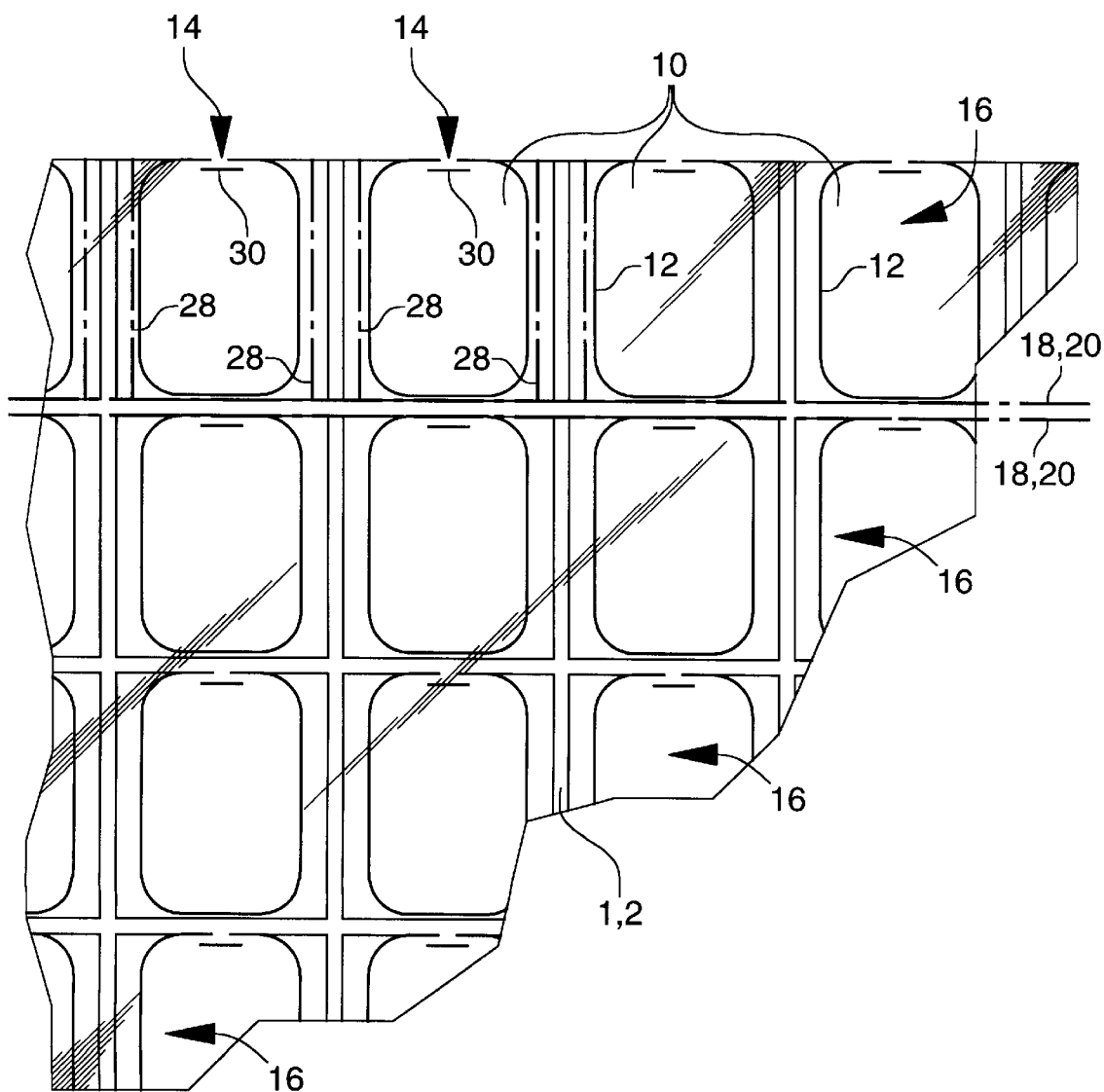
FIG. 4 is a partial plane view of a batch of liquid crystal display cells during manufacture according to the method of the invention.

FIG. 4 shows a plurality of display cells 10 during manufacture according to the method of the invention. These cells 10 are defined between two front 1 and back 2 substrates which are generally transparent, for example, two sheets of glass.

Each cell 10 includes a cavity intended to contain the liquid crystal, this cavity being defined by substrates 1, 2 covered with transparent electrodes 4, 6 and by sealing frames 12 which are made of a material which allows substrates 1, 2 to be fixed one on top of the other. A filling aperture 14 is arranged in sealing frame 12 of each cell 10 facing a wall 30 used to block the plug of glue used to seal aperture 14 after cells 10 have been filled.

Figure 5:
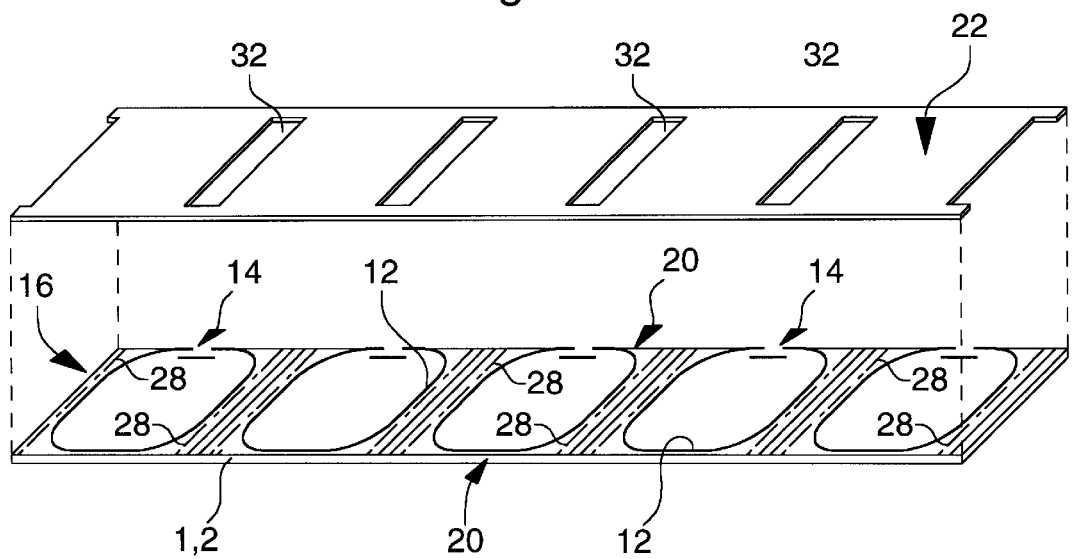
FIG. 5 is a perspective view of a plurality of cells in the form of a strip, prior to the final step of separation into individual cells.
Figure 6:
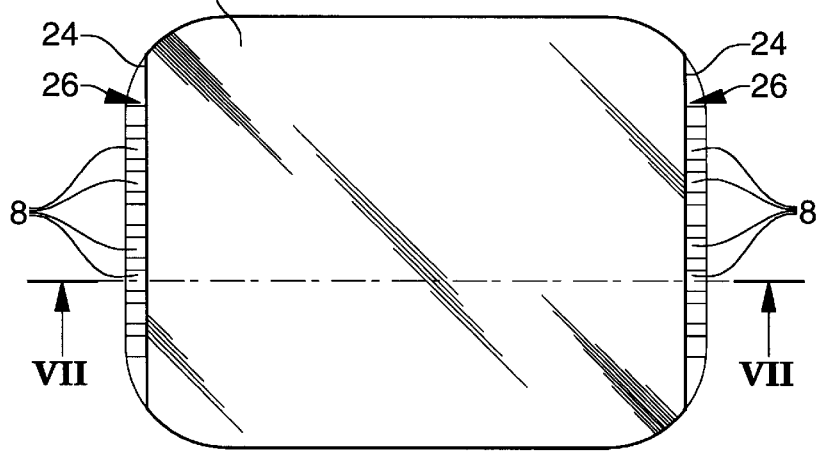
FIG. 6 is a plane view of a display cell according to the invention.
Figure 7:
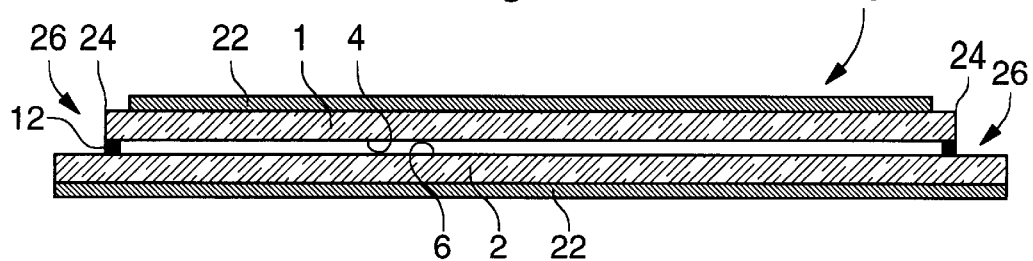
FIG. 7 is a cross-section along the line VII—VII of FIG. 6.

According to the essential feature of the invention, and as is clear from FIGS. 5 and 6, each cell 10 has two rectilinear edges 24 where back substrate 2 projects with respect to front substrate 1, in order to allow contact pads 8 to appear and thus to create two connection zones 26 which can be accessed to establish the electric connection between electrodes 4, 6 of cell 10 and an electric control circuit (not shown). It is thus possible to increase the number of pictures which can be displayed on cell 10 and/or reduce the multiplexing rate of electrodes 4, 6 which allows the optical quality of the display to be improved. This essential result is obtained as a result of the method according to the invention preferably implemented in the manner described hereinbefore.

After depositing electrodes 4, 6 and the paths connecting said electrodes 4, 6 to contact pads 8, the material defining sealing frames 12 is deposited over one of substrates 1, 2 then substrates 1, 2 are assembled one on top of the other. For each cell 10, the two rectilinear edges 24 of front substrate 1, which, in a subsequent step, will allow the corresponding connection zones 28 of cells 10 to appear, are then scribed. According to the invention, rectilinear edges 24, arranged on the periphery of cells 10, are not opposite filling aperture 14, but are arranged, for example, on either side thereof. After marking edges 24, the plurality of cells 10 is divided into rectilinear strips 16 by glass scribing and breaking techniques, or by sawing along dividing lines 18. Cells 10 are then filled with liquid crystal, then hermetically sealed by means of a plug of glue by known techniques. Any necessary external layers, such as a polariser film 22, can then be applied onto each strip 16. As shown in FIG. 4, and according to an advantageous feature of the invention, polariser film 22 has openings or recesses 32 corresponding to the locations where the glass of substrate 1 will subsequently be broken and removed in order to allow connection zones 28 of cells 10 to appear.

The final implementation step of the method according to the invention consists in separating cells 10 into individual cells by means of a high pressure water jet machine. Surprisingly, it will be then noted that the action of the water jet is sufficient to cause the glass to break along rectilinear edges 24, although the latter were scribed a while previously. This contradicts the well established preconceived idea that the glass must be broken shortly after having been scribed. One can then simply proceed to the electric control tests of cells 10.

It goes without saying that various simple modifications and variants fall within the scope of the present invention.

What is claimed is:

1. A manufacturing method for a plurality of electro-optical cells, in particular liquid crystal cells, or electrochemical photovoltaic cells, including the steps of:

forming on two substrates which are made of glass or a synthetic material and at least one of which is transparent, a pattern of conductive elements, these conductive elements forming control electrodes situated at the location of pictures to be displayed and conductive paths connecting these electrodes to contact pads situated at the periphery of the cells;

depositing on one of the substrates a network of material forming sealing frames which define for each cell a sealed volume in which an active medium is confined, each frame including a filling aperture for this purpose;

bonding the substrates to each other to form a batch including several rows of cells;

scribing rectilinear edges on one of the substrates in order to allow the contact pads to appear at the periphery of each cell; and dividing the batch of cells into rectilinear strips each including a row of cells;

wherein this method further includes the step of dividing each strip of cells into individual cells by means of a water jet with, as necessary, shaping of the contour of the cells, the rectilinear edges scribed on one of the substrates in order to allow the contact pads of the cells to appear, being situated in a location which is not opposite the filling openings thereof.

2. A method according to claim 1, wherein it further includes the step of applying onto each strip a polariser film having recesses corresponding to the locations where the glass of the substrate will subsequently be broken and removed in order to allow the contact pads of the cells to appear.

* * * * *